United States Patent
Westcott

(10) Patent No.: US 7,146,961 B1
(45) Date of Patent: Dec. 12, 2006

(54) ENGINE AIR INLET FLOW ENHANCEMENT DEVICE FOR INTERNAL COMBUSTION ENGINES

(76) Inventor: Jeff Westcott, 4733 E. Jaeger Rd., Phoenix, AZ (US) 55050

( * ) Notice: Subject to any disclaimer, the term of this patent is extended or adjusted under 35 U.S.C. 154(b) by 0 days.

(21) Appl. No.: 11/061,896

(22) Filed: Feb. 18, 2005

(51) Int. Cl.
*F02M 35/10* (2006.01)
(52) U.S. Cl. ............................................... 123/184.53
(58) Field of Classification Search ........... 123/184.21, 123/184.53
See application file for complete search history.

(56) References Cited

U.S. PATENT DOCUMENTS

| | | | | |
|---|---|---|---|---|
| 1,683,281 A | * | 9/1928 | Asire | 123/184.39 |
| 3,998,195 A | * | 12/1976 | Scott | 123/531 |
| 5,342,555 A | | 8/1994 | Edmonston | |
| 5,758,614 A | * | 6/1998 | Choi | 123/184.53 |
| 6,557,409 B1 | * | 5/2003 | Setescak | 73/204.21 |

* cited by examiner

*Primary Examiner*—Noah P. Kamen
(74) *Attorney, Agent, or Firm*—Harpman & Harpman

(57) ABSTRACT

An airflow treatment and regulation device for internal combustion engines that stabilizes inlet airflow characteristics before induction into a fuel metering and mixing device. The air stabilization device provides a non-restrictive honeycomb treatment element through which inlet combustion air must pass before entering the carburetor. The honeycomb element eliminates air turbulence and creates a co-adhesive straight line co-planar inlet airflow.

5 Claims, 3 Drawing Sheets

ENGINE AIR INLET FLOW ENHANCEMENT DEVICE FOR INTERNAL COMBUSTION ENGINES

BACKGROUND OF THE INVENTION

1. Field of the Invention

This invention relates to air inlet treatment devices that process the combustion air before it enters a carburetor of an internal combustion engine.

2. Description of Prior Art

Prior art devices of this type such as air cleaners filter the air removing harmful debris that is entrained within the airflow stream which is drawn into the engine for mixture with a fuel for combustion. Air filter screens are known to provide a filter barrier to large debris preventing the debris being drawn into the air filter as a pre-filter method. Also such screens are used independently as a primary filtering device, for example, which uses a simple screen material in combination with a paper or foam filter element or as a substitution therefore.

Additionally, U.S. Pat. No. 5,342,555 discloses a carburetor configuration having an air straightener means which comprises a pair of cross panels positioned within the air inlet of the claimed carburetor.

SUMMARY OF THE INVENTION

An air induction element that is positioned downstream of an air filter on a carburetor and/or the throttle body of an internal combustion engine. The induction element utilizes a mounting fitting that houses a honeycomb treatment structure through which all pre-combustion air must travel. The honeycomb provides a unique multi-processing passageways in which thin wall surfaces of different surface dimensions provide a uniform directional flow pattern to the airstream as it passes therethrough. This process results in the reduction in air turbulence which is typically induced by the air inlet system configuration upstream. The processed airstream results in improved air velocity delivery to the carburetor in a non-restricting venue.

DETAILED DESCRIPTION OF THE INVENTION

Figure 1:
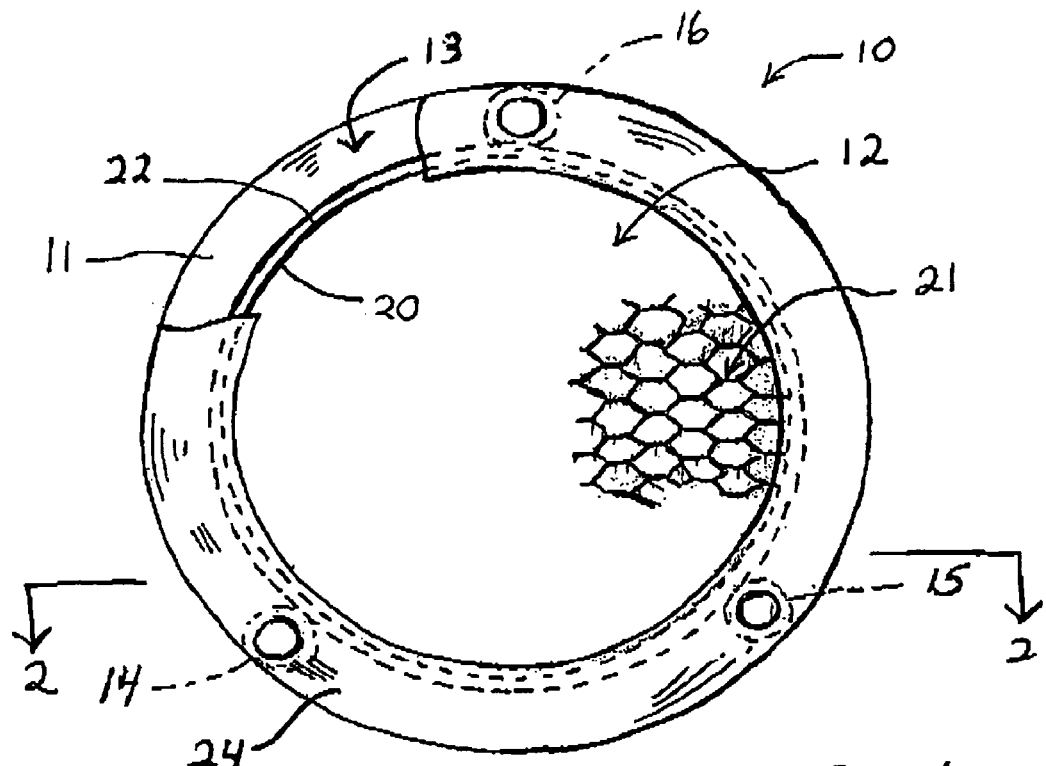
FIG. 1 is a front plan view of the air treatment device of the invention.
Figure 2:
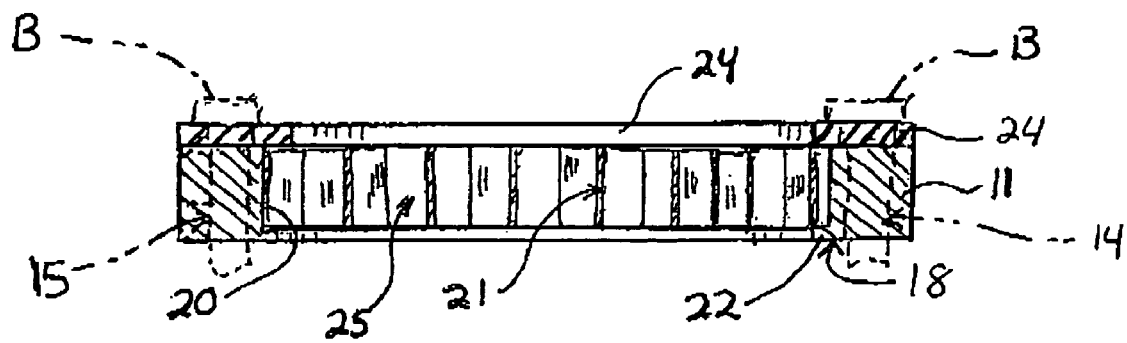
FIG. 2 is a cross-section on lines 2—2 of FIG. 1.
Figure 3:
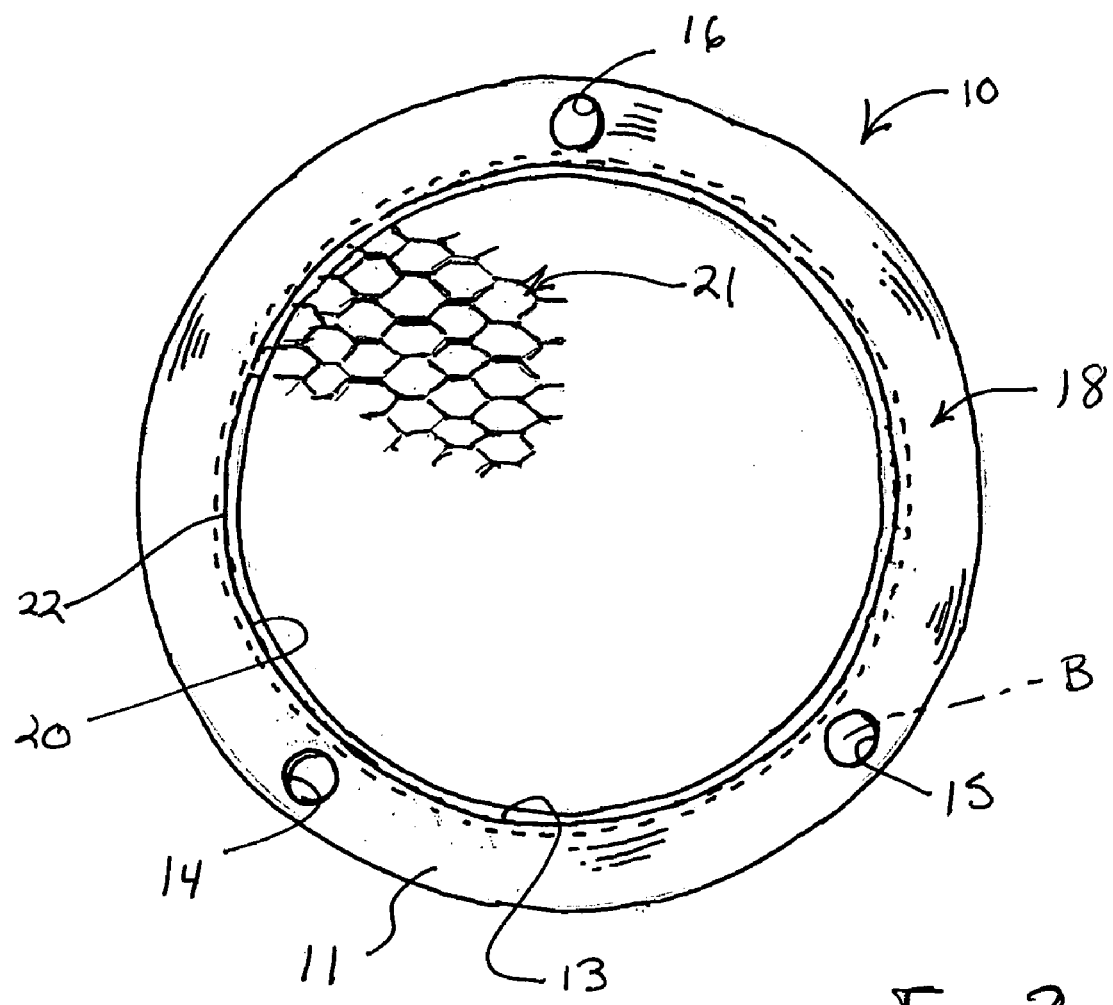
FIG. 3 is a rear plan view of the air treatment device as set forth in FIG. 1.

Referring to FIGS. 1 and 2 of the drawings, an air inlet treatment device 10 of the invention can be seen having a main mounting body member 11 with an airflow passageway 12 therethrough. The main mounting body member 11 has an annular support surface 13 with a plurality of apertures 14, 15 and 16 extending radially therethrough and an oppositely disposed carburetor engagement surface 18 which is secured directly to the air intake portion of a carburetor (not shown). The main mounting body member 11 thus defines an insert receiving opening at 20 therein.

The main mounting body member 11 is preferably composed of a solid material having suitable characteristics of structural strength and weight such as metal or a metal alloy depending on its use application requirements.

Figure 4:
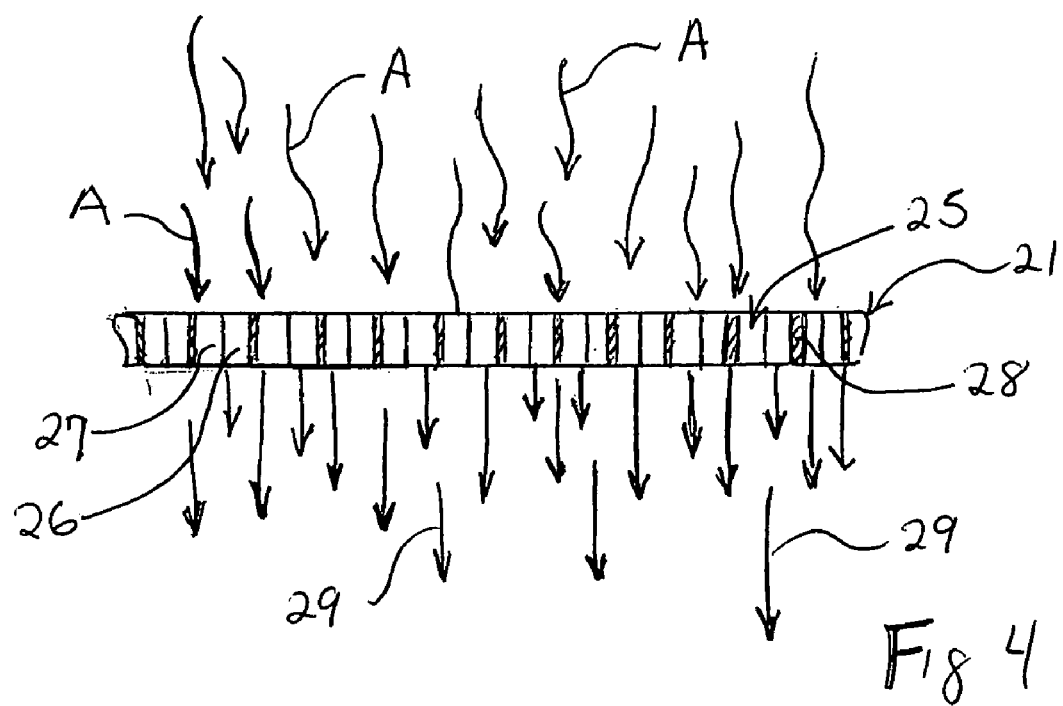
FIG. 4 is an enlarged graphic airflow representation illustrating the air passage through a portion of the air treatment device.
Figure 5:
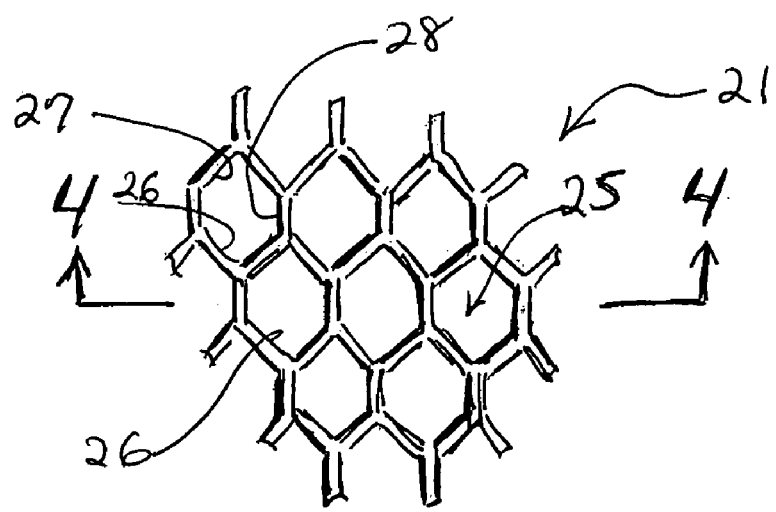
FIG. 5 is an enlarged view of the air treatment structure of the invention.

A honeycomb insert 21, best seen in FIGS. 4 and 5 of the drawings, is positioned within the receiving opening at 20 of the main mounting body member 11 against an annular rib 22 extending inwardly therefrom in spaced relation to the planar surface of the support surface 13. The rib 22 prevents the honeycomb insert 21 from pulling therethrough during use and provides a stable engagement surface therefore. Correspondingly, a retainer cover ring 24 having corresponding apertures A therein registerably engages around the perimeter edge of the honeycomb insert 21 in oppositely disposed relation to the rib 22 and onto the support ring surface 13 securing the honeycomb insert 21 by mounting bolts B shown in broken lines therebetween in an annular edge engagement therewithin.

Referring now to FIGS. 4 and 5 of the drawings, the honeycomb insert 21 is formed preferably of expanded metal specifically aluminum which forms multiple interdependent multiple thin walled passageways 25 within. Each of the passageways 25 is comprised of three opposing co-parallel wall surface pairs 26, 27 and 28. It will be noted that the wall surface pairs 26 and 27 are of an equal surface dimension greater than that of the remaining wall surface pairs 28. The depth of each of the co-formed passageways 25 is proportional to its transverse dimension so as to provide optimum air surface wall engagement sufficient to impart a linear re-alignment of the airflow A as illustrated at 29 therethrough, best seen in FIG. 4 of the drawings graphically.

By stabilizing the directional flow properties of the induction airstream, a better combustion efficiency is achieved which affects engine performance over non-stabilized turbulent induction airflow delivery.

It will be understood that the honeycomb insert 21 of the invention may be provided of alternate construction and material so long as the aggregate area of the apertured passageways 25 are equal to or greater than the airflow area of the induction inlet defined by the main body member 11, cover 24 and ring respectively.

It is also important to note that the efficiency of the air treatment device 10 of the invention requires that no disruption of the process airflow stream be evident downstream thereof.

It will thus be seen that a new and novel air induction inlet element has been illustrated and described which provides for airflow characteristic modifications to eliminate deficiency defiant turbulence and impart directional stability to the airstream as it enters the fuel air mixing and metering carburetor or throttle body on fuel injection applications (not shown) on an internal combustion engine.

It will be apparent to those skilled in the art that various changes and modifications may be made thereto without departing from the spirit of the invention.

Therefore I claim:

1. An air treatment apparatus for attachment over the air inlet for an internal combustion engine comprises, a honeycomb insert airflow guide in a fixed relation over the air inlet thereof, said honeycomb insert having a plurality of individual co-configured parallel passageways with multiple thin walled surface pairs in spaced relation to one another aligned to the directional flow of the air to the air inlet and surrounding air, a main mounting body member secured to said engine support, said honeycomb insert in spaced relation to said engine, means for supporting said honeycomb insert within an annular ring portion of said main body member comprising an annular engagement rib therewithin, a retainer cover ring registerably secured on a support surface of said main mounting ring overlying a portion of said honeycomb insert therewithin, for retaining honeycomb insert within said body member.

2. The air treatment apparatus set forth in claim 1 wherein said individual co-configured parallel passageways further comprise, interior wall surfaces of equal dimensional characteristics.

3. An air treatment apparatus set forth in claim 1 wherein said honeycomb insert is of an annular surface dimension equal to that of said air inlet dimension.

4. An air treatment apparatus set forth in claim 1 wherein said parallel passageways of said honeycomb insert impart a corresponding directional flow to an inlet airstream removing inherent turbulence therewithin.

5. The air treatment apparatus set forth in claim 1 wherein said honeycomb insert is preferably made of expanded metallic material.

* * * * *